United States Patent
Caponetti et al.

(10) Patent No.: US 11,143,165 B2
(45) Date of Patent: Oct. 12, 2021

(54) BLADE LOAD SENSING SYSTEM FOR A WIND TURBINE

(71) Applicant: VESTAS WIND SYSTEMS A/S, Aarhus N (DK)

(72) Inventors: Fabio Caponetti, Aarhus C (DK); Dan Hilton, Gjern (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 470 days.

(21) Appl. No.: 15/736,678

(22) PCT Filed: Jun. 17, 2016

(86) PCT No.: PCT/DK2016/050194
§ 371 (c)(1),
(2) Date: Dec. 14, 2017

(87) PCT Pub. No.: WO2016/206691
PCT Pub. Date: Dec. 29, 2016

(65) Prior Publication Data
US 2018/0156200 A1   Jun. 7, 2018

(30) Foreign Application Priority Data

Jun. 24, 2015   (DK) .............................. PA201570387

(51) Int. Cl.
*F03D 17/00* (2016.01)
*G01K 13/00* (2021.01)
*G01B 11/16* (2006.01)

(52) U.S. Cl.
CPC ............. *F03D 17/00* (2016.05); *G01K 13/00* (2013.01); *F05B 2260/80* (2013.01);
(Continued)

(58) Field of Classification Search
CPC ......... F03D 17/00; F03D 80/50; G01K 13/00; F05B 2260/80; F05B 2260/84;
(Continued)

(56) References Cited

U.S. PATENT DOCUMENTS

| 6,940,186 B2* | 9/2005 | Weitkamp | ............... F03D 7/042 290/44 |
| 7,658,113 B2* | 2/2010 | Confield | ................. B63B 39/06 73/760 |

(Continued)

FOREIGN PATENT DOCUMENTS

| CN | 1602415 A | 3/2005 |
| CN | 102235299 A | 11/2011 |

(Continued)

OTHER PUBLICATIONS

Jens Boersch, Temperature compensation of strain gauges, Webinar [online], HBM [retrieved on Mar. 16, 2020], Retrieved from the Internet: <URL: https://www.hbm.com/fileadmin/mediapool/files/webinars/pdf/2016/Temperature_compensation_of_strain_gauges.pdf> (Year: 2016).*

(Continued)

*Primary Examiner* — Courtney D Heinle
*Assistant Examiner* — Sang K Kim
(74) *Attorney, Agent, or Firm* — Patterson + Sheridan, LLP

(57) ABSTRACT

A method for determining the load on a wind turbine blade, comprising: measuring the blade load by way of a wind turbine blade load sensor; estimating the temperature of the blade; and determining, based on the estimated temperature and the measured load, a temperature-corrected value for the load on the wind turbine blade. The invention also relates to a sensor system for a wind turbine blade, the system comprising a load sensor; a processing unit interfaced with (Continued)

the load sensor and configured to provide a temperature-corrected load parameter as an output, wherein the processing unit includes: a temperature estimation module that determines an estimated temperature of the blade in the vicinity of the load sensor based on at least one wind turbine parameter; and a load compensation module that determines the temperature-corrected load parameter based on the estimated temperature and the measurement of the load sensor.

12 Claims, 4 Drawing Sheets

(52) U.S. Cl.
CPC ..... *F05B 2260/821* (2013.01); *F05B 2260/84* (2013.01); *F05B 2270/303* (2013.01); *F05B 2270/325* (2013.01); *F05B 2270/331* (2013.01); *F05B 2270/808* (2013.01); *G01B 11/16* (2013.01)

(58) Field of Classification Search
CPC .......... F05B 2270/303; F05B 2270/331; F05B 2270/808; G01B 11/16
USPC .......................................... 73/766, 775, 800
See application file for complete search history.

(56) References Cited

U.S. PATENT DOCUMENTS

| | | | | |
|---|---|---|---|---|
| 7,813,598 | B2 * | 10/2010 | Mortensen | ........... G01M 11/086 385/12 |
| 2004/0108732 | A1 | 6/2004 | Weitkamp | |
| 2008/0279499 | A1 | 11/2008 | Mortensen et al. | |
| 2010/0004878 | A1 * | 1/2010 | Volanthen | ............... F03D 1/065 702/42 |
| 2010/0232963 | A1 * | 9/2010 | Volanthen | ............... F03D 1/065 416/146 R |
| 2011/0135474 | A1 | 6/2011 | Thulke et al. | |
| 2013/0255398 | A1 | 10/2013 | Philipsen et al. | |
| 2013/0280070 | A1 | 10/2013 | Lindby et al. | |

FOREIGN PATENT DOCUMENTS

| | | |
|---|---|---|
| CN | 103698063 A | 4/2014 |
| CN | 104024815 A | 9/2014 |
| EP | 1359321 A1 | 11/2003 |
| EP | 2112375 A2 | 10/2009 |
| GB | 2462603 A | 2/2010 |
| WO | 2016206691 A1 | 12/2016 |

OTHER PUBLICATIONS

Micro Measurements, Strain Gage Thermal Output and Gage Factor Variation with Temperature, Aug. 14, 2014, Retrieved from the Internet on Dec. 5, 2020; URL: http://www.vishaypg.com/docs/11054/tn504.pdf (Year: 2014).*
Chinese Office Action for Application No. 201680036882.4 dated May 22, 2019.
Danish Patent and Trademark Search Report for Application No. PA 2015 70387 dated Jan. 25, 2016.
TW Verbruggen et al., "Fibre Optic Blade Monitoring for optimisation of offshore wind farm O&M," Oct. 2012, www.ecn.nl, 46 pages.
International Search Report for Application No. PCT/DK2016/050194 dated Sep. 7, 2016.
R Klosse et al., "Temperature Induced Drift in Mechanical Load Measurements on Wind Turbines Physical Influence of Temperature on Wild Turbine Loads," Jan. 1, 2007, XP055298360.

* cited by examiner

BLADE LOAD SENSING SYSTEM FOR A WIND TURBINE

TECHNICAL FIELD

The invention relates to a system and a method for determining the load experienced by a wind turbine blade.

BACKGROUND

The blades of a wind turbine experience loads during operation due to aerodynamic, gravitational and inertial forces. Excessive loads can damage the blades, and also other components of the wind turbine, and so it is important to ensure that the loads experienced by the blades remain within acceptable limits. In order to monitor this, modern wind turbines are usually provided with a blade load sensor system. Such a system typically includes a load sensor provided in each blade to measure the load experienced by that blade. The load sensors are usually provided in the form of a strain gauge and more particularly as an optical strain gauge, for example similar to the one described in EP1230531.

All strain gauges are fundamentally sensitive to temperature due to thermal expansion of the measured object (i.e. the blade) being detected as strain by the gauge, or due to direct temperature effects on the sensor package itself. To accommodate this, sensor packages are known that include a temperature sensor so that the load signal can be compensated for temperature effects using data from the temperature sensor.

However, such load sensor packages can be expensive, difficult to mount, and also problematic to maintain during the lifetime of the wind turbine, so it is desirable to provide an alternative to such load sensor packages, but without sacrificing the accuracy that is achievable with temperature compensation using an integral temperature sensor.

SUMMARY OF INVENTION

Against this background the invention provides, in a first aspect, a sensor system for a wind turbine blade, the system comprising a load sensor; a processing unit interfaced with the load sensor and configured to provide a temperature-corrected load parameter as an output, wherein the processing unit includes: a temperature estimation module that determines an estimated temperature of the blade in the vicinity of the load sensor based on at least one wind turbine parameter; and a load compensation module that determines the temperature-corrected load parameter based on the estimated temperature and the measurement of the load sensor.

In a second aspect, the invention extends to, and therefore also embraces, a method for determining the load on the load on a wind turbine blade, comprising: measuring the blade load by way of a wind turbine blade load sensor; estimating the temperature of the blade; and determining, based on the estimated temperature and the measured load, a temperature-corrected value for the load on the wind turbine blade.

Embodiments of the invention provide the benefit that the need for the installation of additional sensors in the blade for temperature compensation is avoided. Therefore, sensor packages without temperature sensors can be used, which improves, by way of example: maintainability of the sensor package because temperature calibration is not required; cost of the sensor package since a more simple sensor package is possible; and flexibility of positioning, since a smaller sensor package is possible.

Furthermore, more flexible temperature compensation capability can be provided to existing sensor hardware since the embodiments can be implemented in standard processing hardware.

The load sensor may be an optical strain gauge.

In one embodiment, the temperature estimation module may relate the estimated temperature of the blade in the vicinity of the load sensor directly to the values of the at least one wind turbine parameter. This is a relatively simple solution from an implementation point of view, and may provide acceptably accurate temperature information for some applications. In such a case, the temperature estimation module may relate the estimated temperature of the blade in the vicinity of the load sensor to a temperature measurement of a component or region of the wind turbine remote from the load sensor. Alternative embodiments may involve the temperature estimation module relating the estimated temperature of the blade in the vicinity of the load sensor to the temperature of the ambient environment.

In further alternative embodiments, the temperature estimation module may perform a modelling of the temperature of the blade in the vicinity of the load sensor based on the net heat energy transferred to the interior of the blade.

The invention also extends to a wind turbine blade including a sensor system as hereinbefore defined, to a computer program product downloadable from a communication network and/or stored on a machine readable medium, comprising program code instructions for implementing the method as defined above, and a machine readable medium having stored thereon such a computer program product.

BRIEF DESCRIPTION OF THE DRAWINGS

In order that the invention may be more readily understood, examples of the invention will now be described with reference to the accompanying figures, in which.

DETAILED DESCRIPTION

Figure 1:
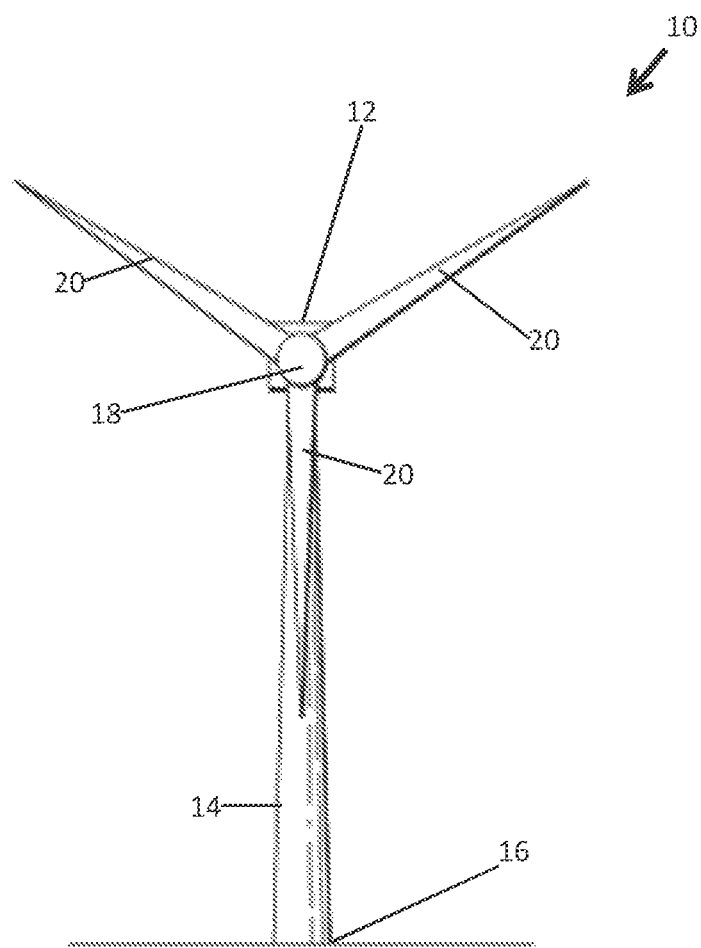
FIG. 1 is a front view of a wind turbine.

Referring to FIG. 1, a wind turbine 10 is shown comprising a nacelle 12 mounted on top of a tower 14 which is itself fixed into a foundation 16 in the usual manner. The nacelle 12 houses various power generating components of the wind turbine 10 and supports a rotor comprising a hub 18 and three blades 20. The wind turbine installation shown in FIG. 1 is a horizontal axis wind turbine (HAWT) installation which is a common type of system, although other types exist to which the invention is also applicable. As is known, the flow of wind acting on the blades 20 spins the rotor which drives the power generation equipment housed in the nacelle 12.

As discussed above, during operation of the wind turbine 10, the blades 20 experience loads due to aerodynamic, gravitational and inertial forces. In order to monitor these loads, the wind turbine 10 is provided with a blade load sensor system 11 in accordance with an embodiment of the invention, features of which will now be described with reference to FIG. 2.

It should be noted at this stage that the accompanying figures are schematic and have been simplified for the purposes of clarity and to avoid unnecessary detail obscuring the principle form of the invention. In practice, of course, the wind turbine would include many more components. The skilled person will appreciate that additional conventional components would be present in a practical implementation of a wind turbine, and so their presence is implied.

Figure 2:
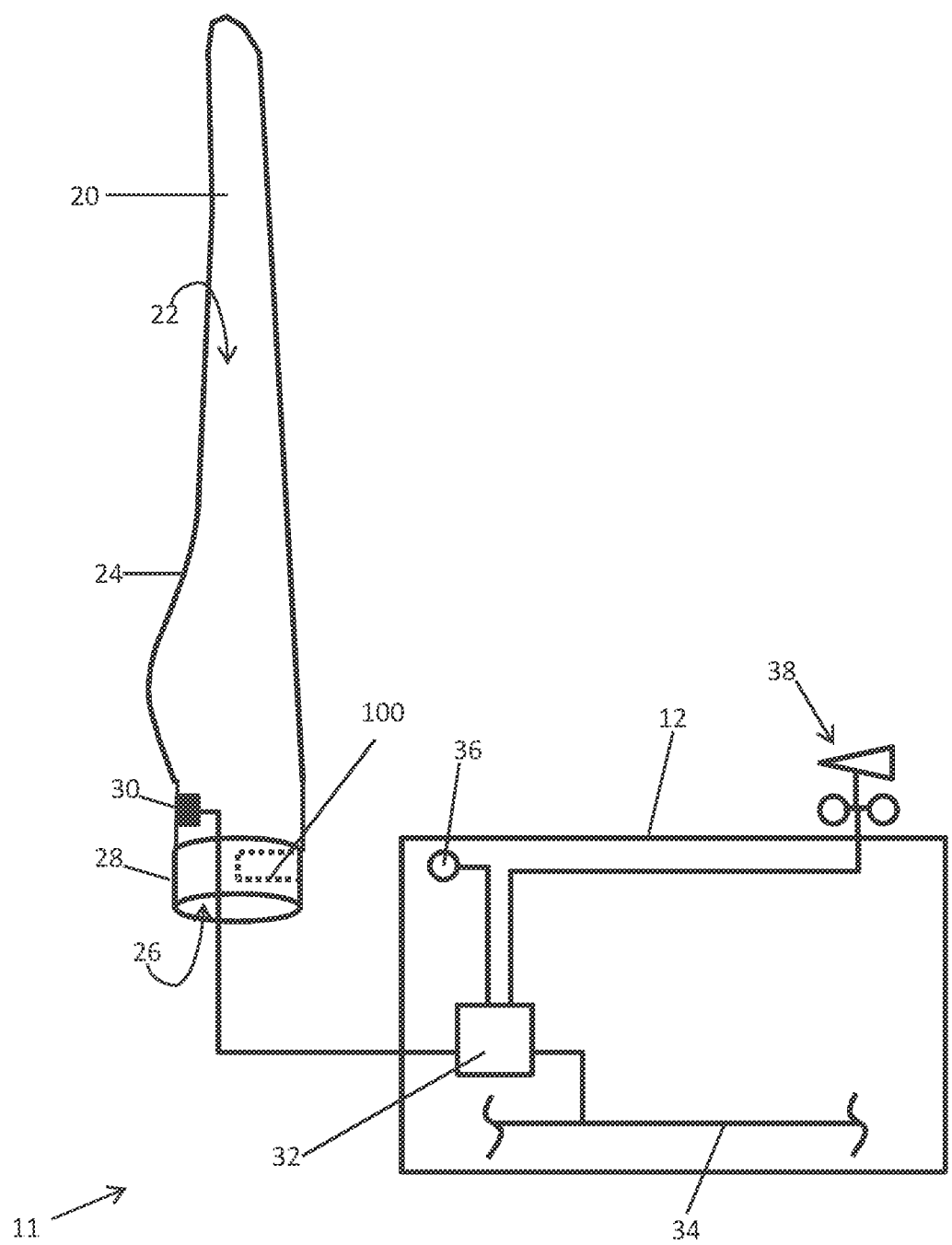
FIG. 2 a blade load sensor system in accordance with an embodiment of the invention.

In FIG. 2, the blade 20 is shown as having an aerofoil profile 22 provided by an outer shell 24 defining a substantially hollow interior 26. The aerofoil profile 22 of the blade 20 blends into a substantially cylindrical section at its root end 28 where the blade 20 is coupled to the hub 18.

The blade 20 includes a load sensor 30 located near to the root end 28 of the blade 20, and the load sensor 30 is interfaced to a processing unit 32 which, in this embodiment, is shown housed in the nacelle 12, although this need not be the case as it may be located elsewhere in the wind turbine. The role of the processing unit 32 is to receive the load signal from the load sensor 30 and to output a load parameter which is temperature-corrected, as will be explained. In FIG. 2, the processing unit 32 is shown as connected to a data bus 34 so that any subsystem connected to that data bus 34 may pick off the blade load parameter from it. However, the processing unit 32 may alternatively be configured to output the load parameter directly to any relevant subsystem.

At this point is should be mentioned that only a single blade 20 is shown in FIG. 2, and that in practice the processing unit 32 may receive data input from load sensors from the other blades. Alternatively, a dedicated processing unit could be provided for each blade. Also, although only a single load sensor 30 is shown, it should be appreciated that each blade could be configured with more than one load sensor, depending on the application.

The load sensor 30 is configured to measure the mechanical deformation of the blade 20. Although in this embodiment the sensor 30 is located at or near to the root end 28, it should be noted that in principle the sensor 30 could be mounted in other positions within the blade 20. The load sensor 30 may be bonded to the interior surface of the blade 20 or alternatively, the sensor 30 may be embedded within the structure of the shell 24 or bonded to the exterior surface. An example of a suitable load sensor is an optical strain gauge such as a fibre Bragg grating (FBG) comprising equally spaced reflection points in the core of the optical fibre that reflect difference wavelengths of light under different levels of strain.

As has been mentioned above, the processing unit 32 is interfaced with the load sensor 30 so as to receive the raw load signal from the load sensor 30 and is configured to perform a temperature correction function so that the load parameter that is output form the processing unit 32 has improved accuracy. In doing so, the processing unit 32 is arranged to monitor (i.e. receive data signals related to) one or more wind turbine parameters. The one or more wind turbine parameters may include, but are not restricted to: the nacelle temperature and the ambient temperature. For this purpose, the wind turbine 10 is provided with various sensors which provide data signals to the processing unit 32. The skilled person will appreciate that the sensors may provide signals to the processing unit 32 via a wired or wireless connection, as appropriate.

As can be seen in FIG. 2, the nacelle 12 includes an interior temperature sensor 36 to measure the temperature inside the nacelle 12. The interior temperature sensor 36 may be part of a nacelle temperature control system which maintains the temperature inside the nacelle 12 within acceptable operational limits to prevent the power generation equipment inside the nacelle 12 from overheating.

The nacelle 12 also includes an ambient temperature sensor 38 to measure the ambient air temperature in the vicinity of the wind turbine 10. In FIG. 2, the ambient temperature sensor 38 is shown as part of a meteorological system (or 'met mast') mounted to the nacelle, but the ambient temperature sensor 38 may be provided as simply a temperature sensing package mounted on any suitable component of the wind turbine 10 or provided remotely from the wind turbine 10. Alternatively, it is envisaged that the processing unit 32 may receive information relating to the ambient air temperature from an external meteorological information source that may be accessed, for example, via a conventional wireless connection.

Having described the general arrangement of the components of the blade load sensor system, further details of an embodiment of the invention will now be described with reference to FIG. 3.

Figure 3:
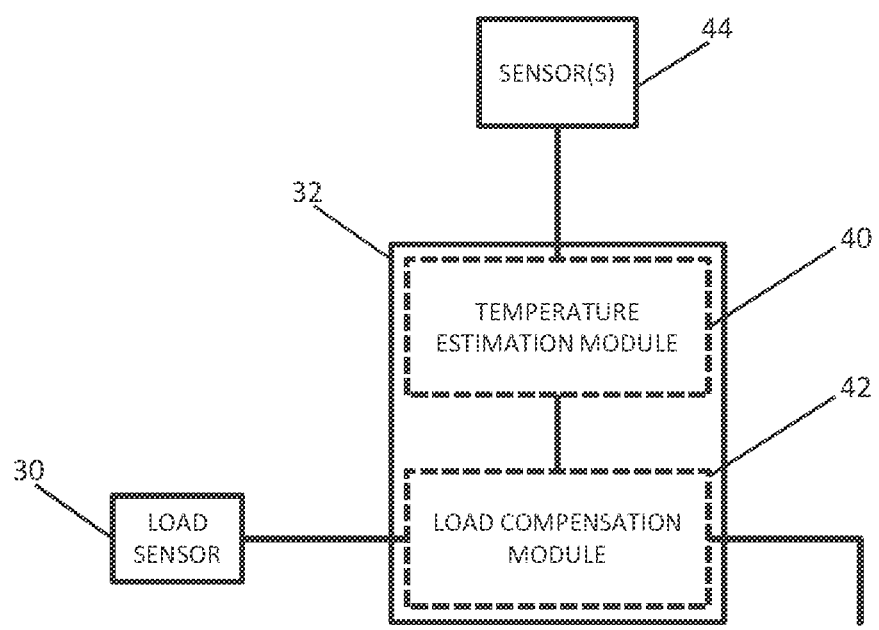
FIG. 3 is a block diagram showing features of the system in more detail.

As shown in FIG. 3, the processing unit 32 comprises a temperature estimation module 40 and a load compensation module 42, represented as functional blocks in FIG. 3. Although not illustrated specifically in FIG. 3, it should be appreciated that the processing unit 32 also includes a memory area on which suitable software is stored and an execution environment to run the control software. It should be noted at this stage that the functional blocks illustrate a specific functionality of the processing unit 32 and, as such, they may be implemented on hardware, software or firmware, either within the same processing environment or on a distributed processing architecture. That is to say, the functional architecture illustrated in FIG. 3 is not intended to limit the invention to a specific hardware or software architecture, platform or processing environment. The system architecture discussed here is used merely as an example to illustrate the technical functionality of the invention and the invention may be implemented by a system having a different specific architecture.

The temperature estimation module 40 is shown in FIG. 3 as receiving a data input signal from one or more sensors 44. As illustrated in FIG. 2, these data input signals may correspond to the ambient temperature and the nacelle temperature.

The role of the temperature estimation module 40 is to output an estimated temperature of the blade 20 (in the vicinity of the load sensor) based on the input signals. In order to output an estimated temperature, the temperature estimation module 40 implements a blade temperature model. The temperature estimation module 40 may implement the model by performing algorithms or, in other embodiments, the model may be implemented by consulting a stored data set that correlates values of input signals to values of the estimated blade temperature, i.e. a 'look-up table'.

The load compensation module 42 is shown in FIG. 3 as receiving two data input signals. The first data input signal is the output of the temperature estimation module 40, i.e. the estimated temperature of the blade. The second data signal input is measured blade load data from the load sensor 30 mounted on the blade. The role of the load compensation module 42 is to output a temperature-corrected load parameter based on the two data input signals: the measured load and the estimated blade temperature.

In determining an estimated blade temperature, the temperature estimation module 40 may implement various forms of temperature model depending on the accuracy of the temperature estimation that is required. Some examples will now be described by way of illustration.

Figure 4:
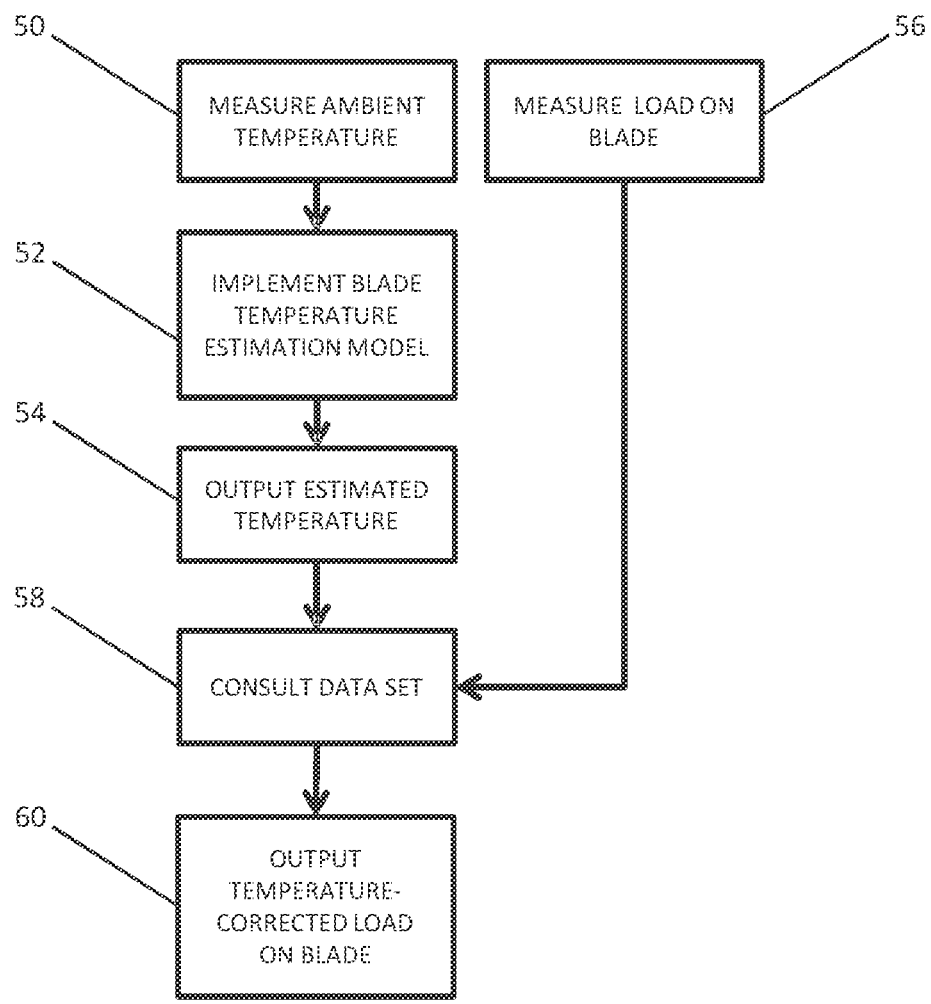
FIG. 4 is flow chart illustrating steps of a method that may be performed by the system of FIG. 3.

According to one embodiment of the invention, the temperature estimation model assumes that the blade temperature is equal to the ambient temperature in the vicinity of the blade, and therefore relates the estimated temperature directly to the ambient temperature. Thus, there is only one data input signal to the temperature estimation module 40, namely ambient temperature data from the ambient temperature sensor 38, such that the output of the temperature estimation module 40 is the same as the input. In such an embodiment, it is not necessary for the blade load sensor system to include a nacelle temperature sensor, which enables a simpler and less expensive load sensor package to be provided. Also, it is possible to implement the invention on existing load sensing hardware, which saves hardware cost, but also manpower and system downtime. Details of a method that may be implemented by this blade load sensor system will now be described with reference to FIG. 4 which shows a flow diagram illustrating steps of that method.

At step 50, the ambient temperature sensor 38 makes a measurement of the ambient temperature. The ambient temperature sensor 38 outputs a signal indicating the ambient temperature to the temperature estimation module 40 of the processing unit 32.

At step 52 the temperature estimation module 40 implements the blade temperature estimation model and, at step 54, outputs a signal indicating the estimated blade temperature. The estimated blade temperature is equal to the measured ambient temperature and so the temperature estimation module 40 is configured to provide an output signal that is the same as the input signal.

At step 56, the blade load sensor 30 makes a measurement of the load experienced by the blade 20 and outputs a signal indicating the value of this measurement to the load compensation module 42 of the processing unit 32. This step may be performed whilst the temperature of the blade is estimated; that is, simultaneously with steps 50, 52 and 54. Alternatively, the blade load sensor system may be configured to perform these steps sequentially.

At step 58, the load compensation module 42 receives the estimated temperature data signal from the temperature estimation module and the measured load data signal from the blade load sensor. The load compensation module 42 consults a stored data set in the form of a look-up table that correlates values of the estimated blade temperature and the measured load experienced by the blade with temperature-corrected values of the load experienced by the wind turbine blade 20. The values of the look-up table may have been calculated in advance or determined empirically before being stored in the memory area of the processing unit 32. For example, such a data set may correlate load readings with adjusted load values which have been compensated for the known temperature, given the known expansion coefficient of the load sensor. In other embodiments, the load compensation module 42 may perform one or more algorithms to determine the temperature-corrected load experienced by the blade 20.

At step 60, the load compensation module 42 outputs a signal indicating the value of the lookup table that corresponds to the values of the load compensation module inputs. The output of the load compensation unit 42 can then be provided to various systems of the wind turbine 10 as required.

In other embodiments, it is envisaged that other wind turbine parameters, i.e. other temperature measurements, could be used as the estimated blade temperature. For example, the temperature measurement from one of the other temperature sensors from within the same blade could be used as the estimated temperature, or, indeed, the temperature measurement from a sensor mounted in one of the other blades of the wind turbine, based on the understanding that the blade temperatures should be about the same, given the common ambient environment. Still further, the temperature measurement of another wind turbine could be used for the estimated temperature.

Tests have shown that the relatively simple blade temperature model described above gives good results in practice. The temperature-corrected load values provided by the blade load sensor system are sufficiently accurate for a number of applications. However, for circumstances where an even more accurate value for the temperature-corrected load is required, it is envisaged that the temperature estimation module 40 would implement a more sophisticated blade temperature model to give a more accurate estimate of the temperature of the blade. One such model is described below by way of example.

The model described here estimates the temperature in the hollow interior 26 of the blade. This gives a good estimate of the temperature of the blade 20 in the vicinity of the load sensor 30 for embodiments where the load sensor 30 is bonded to the interior surface of the blade 20. However, this model is also applicable to embodiments where the load sensor 30 is provided elsewhere in the blade 20 since the blade cavity 26 and the blade shell 24 are in good thermal contact and so have similar temperatures.

In this alternative embodiment, the blade temperature model is constructed based on the net heat transferred to the blade cavity 26. If the net heat transfer can be determined, the temperature of the blade 20 can be calculated according to the specific heat relation:

$$Q_{net} = cm(T_b - T_i)$$

where: $Q_{net}$ is the net heat transferred to the blade cavity 26; c is the heat capacity of air at standard temperature and pressure; m is the mass of the air within the blade cavity 26; $T_b$ is the temperature of the blade cavity 26 and $T_i$ is the initial temperature of the blade cavity 26.

In order to determine the heat transferred to the blade cavity 26, it is necessary to consider how heat is transferred to and from the blade 20. In this model, it is assumed that the blade 20 is in thermal contact with the ambient surroundings and the nacelle 12 only. Generally, heat is transferred from the nacelle 12 to the blade 20, through apertures in the blade bulkhead near to the root 28 of the blade 20, and from the blade 20 to the surroundings via the material of the blade shell 24.

Newton's law of cooling allows the quantity of heat transferred to or from the blade 20 to be quantified. Newton's law of cooling states that:

$$\frac{dQ}{dt} = h \cdot A \cdot (T_1 - T_2)$$

where: Q is the heat transferred from a first body to a second body; h is the heat transfer coefficient; A is the heat transfer surface area and $T_1$ and $T_2$ are the temperatures of the first and second bodies respectively.

Using this relation, and integrating over time, the amount of heat transferred to the blade cavity 26 is given by:

$$Q_{net} = Q_{nacelle \rightarrow blade} - Q_{blade \rightarrow environment}$$

$$= \int h_n A_n (T_n - T_b) dt - \int h_b A_b (T_b - T_a) dt$$

where: $h_n$ and $h_b$ are the heat transfer coefficients between the nacelle 12 and the blade 20, and the blade 20 and the surroundings respectively; $A_n$ is the combined area of the apertures at the root end 28 of the blade 20 leading to the hub 18; $A_b$ is the surface area of the aerofoil profile 22 of the blade 20 and $T_n$, $T_b$ and $T_a$ are the nacelle, blade and ambient temperatures respectively.

Combining the above equation with the specific heat relation and including time evolution factors, the skilled person will appreciate that the temperature of the blade cavity 26 is given by:

$$T_b = T_i + \frac{1}{cm}[-(T_n - T_b)e^{-h_n A_n t} + (T_b - T_a)e^{-h_b A_b t}]$$

Thus, a blade temperature model is provided that relates the temperature of the blade 20 in the vicinity of the load sensor 30 to the ambient temperature (as measured by the ambient temperature sensor 38) and the nacelle temperature (as measured by the nacelle temperature sensor 36).

As discussed above, the temperature estimation module 40 may implement the above model by performing one or more algorithms to calculate a value for the estimated blade temperature. The values of the relevant constants may be stored in the memory area of the processing unit 32. For example, the thermal coefficients may be determined empirically by system identification, involving equipping a test blade with suitable sensors and deriving a mapping between measured air temperatures to the internal blade temperature. Alternatively, the estimated blade temperature may be calculated for a range of ambient and nacelle temperatures ahead of time and stored in the memory area of the processing unit 32 as a lookup table. The temperature estimation module 40 can then consult this look-up table to determine the estimated blade temperature based on the measured ambient and nacelle temperatures at that moment in time.

The temperature estimation module 40 outputs a signal indicating the estimated blade temperature which is received by the load compensation module 42 and used to determine a temperature-corrected load value, similar to the method described above in relation to FIG. 4.

It will be appreciated that many modifications may be made to the above examples without departing from the scope of the present invention as defined in the accompanying claims. It is envisaged that in other embodiments of the invention, the temperature estimation module 40 will implement other blade temperature models. These models may include the effects of any other factors affecting the temperature of the blade 20 as is appropriate for the configuration of the wind turbine 10 and the required accuracy of the temperature-corrected load value.

For example, a blade sensor system according to an embodiment of the invention may be installed in a blade including an anti-icing system, as indicated by the dashed box in FIG. 2, and indicated with the reference 100. The anti-icing system 100 prevents ice from forming on the surfaces of the blade shell 24 by circulating hot air around the blade cavity 26 when required. It is envisaged that the temperature module will implement a blade temperature model that accounts for the effect of the heat transferred to the blade cavity 26 by the anti-icing system 100. To this end, the anti-icing system 100 may include a status indicator that provides a signal to the processing unit 32 indicating the heat transferred to the blade cavity 26 by the anti-icing system 100.

It is also envisaged that in other embodiments of the invention, the blade temperature model will be constructed empirically in full or in part. The necessary experimental data could be acquired from a working wind turbine in situ or from controlled experiments conducted in a laboratory or workshop.

The invention claimed is:

1. A sensor system for a wind turbine blade of a wind turbine, the sensor system comprising:
   a load sensor providing a load measurement of blade load on the wind turbine blade;
   a hardware processor interfaced with the load sensor and configured to provide a temperature-corrected load parameter as an output, wherein the hardware processor is configured to:
      estimate a temperature of the wind turbine blade in a vicinity of the load sensor based on at least one of: a measured temperature of a nacelle of the wind turbine, a measured temperature of a second wind turbine blade of the wind turbine, or a measured temperature of a second wind turbine; and
      determine the temperature-corrected load parameter based on the estimated temperature of the wind turbine blade and the load measurement.

2. The sensor system of claim 1, wherein the hardware processor is further configured to relate the estimated temperature of the wind turbine blade in the vicinity of the load sensor directly to values of the measured temperature of the nacelle, the measured temperature of the second wind turbine blade, or the measured temperature of the second wind turbine.

3. The sensor system of claim 2, wherein the hardware processor is further configured to relate the estimated temperature of the wind turbine blade in the vicinity of the load sensor to a temperature measurement of a component or region of the wind turbine remote from the load sensor.

4. The sensor system of claim 3, wherein the hardware processor is further configured to relate the estimated temperature of the wind turbine blade in the vicinity of the load sensor to a temperature of an ambient environment.

5. The sensor system of claim 1, wherein the load sensor is an optical strain gauge.

6. A wind turbine blade, comprising:
   an aerodynamic body; and
   a sensor system disposed on the aerodynamic body, wherein the sensor system comprises:
      a load sensor providing a load measurement of blade load on the wind turbine blade;
      a hardware processor interfaced with the load sensor and configured to provide a temperature-corrected load parameter as an output, wherein the hardware processor is configured to:
         determine an estimated temperature of the wind turbine blade in a vicinity of the load sensor based on at least one of: a measured temperature of a nacelle of a first wind turbine comprising the wind turbine blade, a measured temperature of a second wind turbine blade of the first wind turbine, or a measured temperature of a second wind turbine; and determine the temperature-corrected load parameter based on the estimated temperature and the load measurement.

7. The wind turbine blade of claim 6, wherein the load sensor is incorporated into a root end of the wind turbine blade.

8. A method for determining a load on a wind turbine blade of a wind turbine, comprising:
- while operating the wind turbine, measuring a load on the wind turbine blade by way of a wind turbine blade load sensor;
- estimating, using a hardware processor, a temperature of the wind turbine blade in a vicinity of the wind turbine blade load sensor based on at least one of: a measured temperature of a nacelle of the wind turbine, a measured temperature of a second wind turbine blade of the wind turbine, or a measured temperature of a second wind turbine; and
- determining, using a hardware processor and based on the estimated temperature and the measured load, a temperature-corrected value for the load on the wind turbine blade.

9. The method of claim 8, wherein the estimated temperature of the wind turbine blade in the vicinity of the wind turbine blade load sensor is related directly to a value of the measured temperature of a nacelle of the wind turbine, a measured temperature of a second wind turbine blade of the wind turbine, or a measured temperature of a second wind turbine.

10. The method of claim 9, wherein the estimated temperature of the wind turbine blade in the vicinity of the wind turbine blade load sensor is related directly to a temperature measurement of a component or region of the wind turbine remote from the wind turbine blade load sensor.

11. The method of claim 10, wherein estimating the temperature of the wind turbine blade in the vicinity of the wind turbine blade load sensor is related directly to a temperature of an ambient environment.

12. A computer program product comprising program code instructions stored on a non-transitory computer readable medium which, when executed by one or more computer processors, performs an operation for determining a load on a wind turbine blade, the operation comprising:
- measuring a blade load by way of a wind turbine blade load sensor;
- modelling a temperature of the wind turbine blade in a vicinity of the wind turbine blade load sensor based on a net heat energy transferred to an interior of the wind turbine blade; and
- determining, based on the modelled temperature and the measured blade load, a temperature-corrected value for the load on the wind turbine blade.

* * * * *